(12) United States Patent
Lowdermilk et al.

(10) Patent No.: US 10,094,592 B2
(45) Date of Patent: Oct. 9, 2018

(54) WATER HEATER WITH THERMAL BREAK

(71) Applicant: A. O. Smith Corporation, Milwaukee, WI (US)

(72) Inventors: John Robert Lowdermilk, Bristol, TN (US); Donald Irvin Pridemore, Jr., Jonesborough, TN (US); Bradley S. Yon, Kingsport, TN (US); Steven Lawrence Tilson, Erwin, TN (US)

(73) Assignee: A. O. Smith Corporation, Milwaukee, WI (US)

( * ) Notice: Subject to any disclaimer, the term of this patent is extended or adjusted under 35 U.S.C. 154(b) by 32 days.

(21) Appl. No.: 15/333,998

(22) Filed: Oct. 25, 2016

(65) Prior Publication Data

US 2017/0115030 A1 Apr. 27, 2017

Related U.S. Application Data

(60) Provisional application No. 62/246,405, filed on Oct. 26, 2015.

(51) Int. Cl.
*F22D 7/04* (2006.01)
*F24H 9/12* (2006.01)

(52) U.S. Cl.
CPC ................... *F24H 9/124* (2013.01)

(58) Field of Classification Search
CPC ....... F24H 9/0047; F24D 19/0092; F22D 7/04
See application file for complete search history.

(56) References Cited

U.S. PATENT DOCUMENTS

| 4,321,943 | A | | 3/1982 | Haws | |
|---|---|---|---|---|---|
| 4,940,024 | A | * | 7/1990 | Grabietz | F24D 17/0073 122/19.1 |
| 5,054,437 | A | * | 10/1991 | Kale | F24H 9/124 122/19.1 |
| 5,341,770 | A | * | 8/1994 | Lannes | F24H 9/0042 122/19.2 |
| 5,351,712 | A | | 10/1994 | Houlihan | |
| 5,838,879 | A | | 11/1998 | Harris | |
| 6,138,614 | A | * | 10/2000 | Shropshire | F24H 9/124 122/13.3 |
| 6,173,118 | B1 | | 1/2001 | Harris | |
| 6,553,947 | B2 | * | 4/2003 | Bradenbaugh | F24H 1/18 122/13.3 |
| 6,628,894 | B2 | | 9/2003 | Winter et al. | |
| 7,017,251 | B1 | * | 3/2006 | Murphy | C23F 13/18 204/196.17 |
| 9,222,697 | B2 | * | 12/2015 | Rodriguez | F24H 1/181 |
| 2011/0247572 | A1 | * | 10/2011 | Smith | F24H 1/205 122/19.1 |
| 2017/0003050 | A1 | * | 1/2017 | Ward | F24H 9/2007 |
| 2017/0167752 | A1 | * | 6/2017 | Yin | F24H 1/188 |

* cited by examiner

*Primary Examiner* — Gregory A Wilson
(74) *Attorney, Agent, or Firm* — Michael Best & Friedrich LLP (57) ABSTRACT

A water heater including a thermal break in the form of an air pocket that moves into an air trap segment of the cold water pipe to reduce heat loss during standby. The air pocket is pushed back into the tank by incoming cold water during a hot water and reforms at the top of the tank. During standby, the air pocket moves into the air trap via an anti-siphon hole communicating with the cold water inlet. The anti-siphon hole can be, for example, in the top of the dip tube.

19 Claims, 6 Drawing Sheets

WATER HEATER WITH THERMAL BREAK

BACKGROUND

The present invention relates to a tank-type water heater having a thermal break in the form of an air pocket to reduce energy loss during standby.

SUMMARY

In one embodiment, the invention provides a water heater including a thermal break in the form of an air pocket that moves into an air trap segment of the cold water pipe to reduce heat loss during standby.

One aspect, the invention provides a water heater, comprising: a tank defining an interior space adapted to contain water, a top portion of the interior space accommodating an air pocket; a heat source operable to heat the water within the tank; a hot water outlet in fluid communication with the interior space at an outlet height below the top portion to draw hot water from the tank; and a cold water inlet in fluid communication with the top portion, the cold water inlet adapted to deliver cold water to the interior space from a cold water source; wherein, during standby of the water heater, cold water leaks into the top portion through the cold water inlet and air from the air pocket displaces into the cold water inlet, the displaced air forming a thermal break between water within the interior space and the cold water source; and wherein, during a draw of hot water, the air of the thermal break is pushed into the interior space by cold water being introduced into the interior space through the cold water inlet, and the air pocket is reformed in the top portion.

In some aspects of the invention, the cold water inlet includes an anti-siphon mechanism communicating with the top portion; and during standby of the water heater cold water leaks into the top portion through the anti-siphon mechanism and air from the air pocket displaces into the cold water inlet through the anti-siphon mechanism. In some aspects of the invention, the cold water inlet includes a dip tube having an anti-siphon hole communicating with the top portion; and during standby of the water heater cold water leaks into the top portion through the anti-siphon hole and air from the air pocket displaces into the cold water inlet through the anti-siphon hole. In some aspects of the invention, a maximum height of the top portion is 7 inches or 5 inches or 2 inches or 1 inch. In some aspects of the invention, the hot water outlet includes an outlet tube extending through the top portion. In some aspects of the invention, the hot water outlet includes an outlet tube extending vertically through the top portion. In some aspects of the invention, the hot water outlet includes an outlet tube extending horizontally below the top portion. In some aspects of the invention, the hot water outlet includes an outlet tube having a horizontally-facing opening for the flow of hot water horizontally into the outlet tube during a hot water draw. In some aspects of the invention, the water heater further comprises a gasket forming an airtight seal up to a pressure of 60 psi around the hot water outlet to prevent leakage of the air pocket around the hot water outlet. In some aspects of the invention, the water heater further comprises a cold water supply pipe communicating between the cold water inlet and the cold water source, the cold water supply pipe including an air trap segment to trap the displaced air and form the thermal break. In some aspects of the invention, the air trap segment includes a local high point section to trap the displaced air and form the thermal break. In some aspects of the invention, a volume of the top portion is equal to or greater than a volume of the air trap segment.

In another aspect, the invention provides a method for heating water, comprising: providing a water heater including a tank having an interior space, a cold water inlet communicating between a top portion of the interior space and a cold water source, a hot water outlet communicating with the interior space at an outlet height below the top portion, and a heat source; filling the tank with water through the cold water inlet while the hot water outlet is open, to form an air pocket in the top portion; heating the water in the tank with the heat source; during standby, leaking water through the cold water inlet into the top portion and displacing air from the air pocket into the cold water inlet to form a thermal break between water within the interior space and the cold water source; drawing hot water from the interior space at the outlet height through the hot water outlet; introducing cold water into the interior space through the cold water inlet in response to drawing hot water from the interior space; pushing the air of the thermal break into the interior space with the cold water being introduced; and reforming the air pocket in the top portion with the air that is pushed into the interior space.

In some aspects of the invention, the cold water inlet includes an anti-siphon mechanism communicating with the top portion; and leaking cold water into the top portion and displacing air from the air pocket are both performed through the anti-siphon mechanism. In some aspects of the invention, the cold water inlet includes a dip tube having an anti-siphon hole communicating with the top portion; and leaking cold water into the top portion and displacing air from the air pocket are both performed through the anti-siphon hole. In some aspects of the invention, the method further comprises: forming an airtight seal up to a pressure of 60 psi around the hot water outlet to prevent leakage of the air pocket around the hot water outlet. In some aspects of the invention, the method further comprises: communicating the cold water source with the cold water inlet through a cold water supply pipe having an air trap segment; and wherein forming the thermal break includes capturing the displaced air in the air trap segment.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
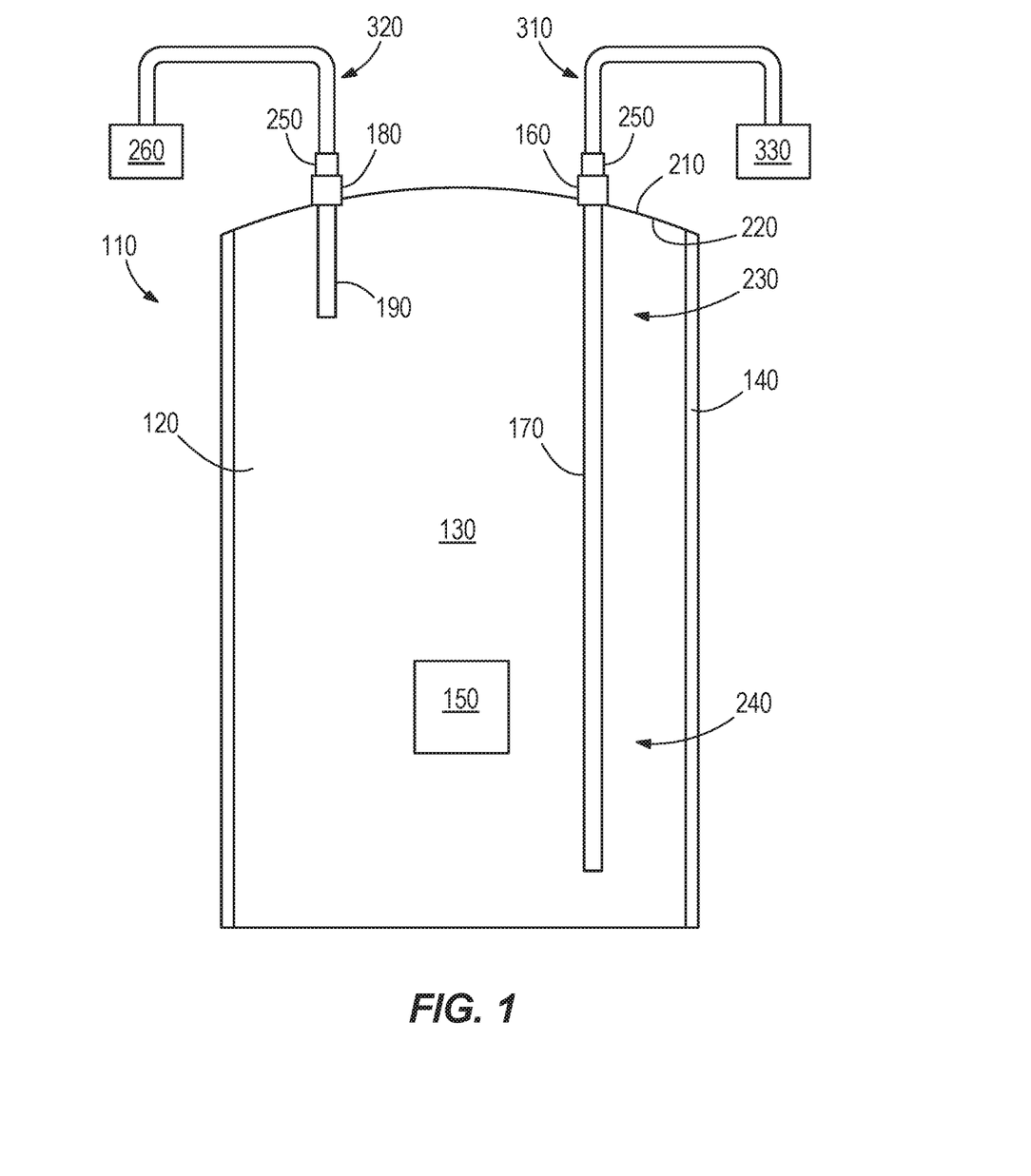
FIG. 1 is a cross sectional view of a tank-type water heater embodying the invention.

With reference to FIG. 1, a tank-type water heater 110 includes a tank 120 defining an interior space 130 for holding water, insulation 140 around the tank 120 to reduce heat loss, a heat source 150 for heating the water in interior space 130, an inlet spud 160, a dip tube 170 extending into the interior space 130, an outlet spud 180, and an outlet tube or outlet conduit 190 extending into the interior space 130.

The tank 120 includes an upper head 210 that is dome-shaped with a concave side 220 facing into the interior space 130. The tank 120 and interior space 130 include a top portion 230 (a top boundary of which is defined by the concave surface 220) and a lower portion 240. During ordinary operation of the water heater 110, water can only enter and exit the interior space 130 via the inlet spud 160 and outlet spud 180. Other openings in the tank 120 (including but not limited to a drain, a temperature and pressure (T&P) relief valve spud, an anode spud, and an electric heating element spud or gas valve spud) are water-tightly closed during ordinary operation.

The heat source 150 is shown schematically in FIG. 1 and is intended to include a gas-fired burner in a combustion chamber with one or more flues extending through the interior space 130, one or more electric heating elements, the condenser of a heat pump, waste heat from another device, or any other device for generating heat and transferring the heat to the water in the tank 120. Embodiments of the present invention can include any combination of the example heat sources provided above, combined with each other or with any other suitable devices used as the heat source 150.

The inlet spud 160 and outlet spud 180 are welded or otherwise permanently affixed to the upper head 210. Each surrounds a hole in the upper head 210 and includes interior threads. A connector 250 such as a pipe nipple places the inlet and outlet spuds 160, 180 in communication with a cold water pipe 310 and a hot water pipe 320, respectively. The dip tube 170 extends from the inlet spud 160 into the lower portion 240 of the water tank 120. The outlet tube 190 also extends from the outlet spud 180 into the interior space 130 of the tank 120, in a manner that is described in more detail below.

The dip tube 170 and outlet tube 190 are sealed with respect to the respective cold water and hot water pipes 310, 320 such that during ordinary operation of the water heater 110 water can only flow into and out of the interior space 130 through the dip tube 170 and outlet tube 190. In various embodiments of the invention, the dip tube 170 and outlet tube 190 may be supported by a top flange which sits in the associated spud 160, 180, or may be combined with the associated connector 250, or may be supported in any other suitable way.

The dip tube 170 and outlet tube 190 are illustrated in FIG. 1 as relatively simple open-ended tubes, with axial openings (i.e., openings that permit flow parallel to the longitudinal axis of the dip tube 170 or outlet tube 190). Other embodiments of the dip tube 170 and outlet tube 190 may include transverse openings (i.e., openings that permit flow perpendicular to the respective longitudinal axes) or a combination of axial and transverse openings. In the configuration illustrated in FIG. 1, both the dip tube 170 and the outlet tube 190 are vertically oriented (i.e., the longitudinal axes are vertical). With the axial openings of these tubes in FIG. 1, flow is directed vertically (down from the dip tube 170 and up into the outlet tube 190).

A hot water access point or point-of-use 260, such as a faucet or a water-consuming appliance, communicates with the hot water pipe 320. Cold water is supplied at supply pressure (usually around 30 psi but sometimes as high as 60 psi) from a cold water source 330 (e.g., a water utility or well pump) through the cold water pipe 310. When the access point 260 is opened, the hot water pipe 320 is exposed to atmospheric pressure, which permits cold water to flow at supply pressure into the lower portion 240 of the tank 120 via the dip tube 170 and displace hot water from the interior space 130 of the tank 120 via the outlet tube 190 and hot water pipe 320. During standby (i.e., between hot water draws, when the access point 260 is closed), the heat source 150 heats the water in the tank 120 that has been cooled by introduction of cold water into the lower portion 240.

Figure 2:
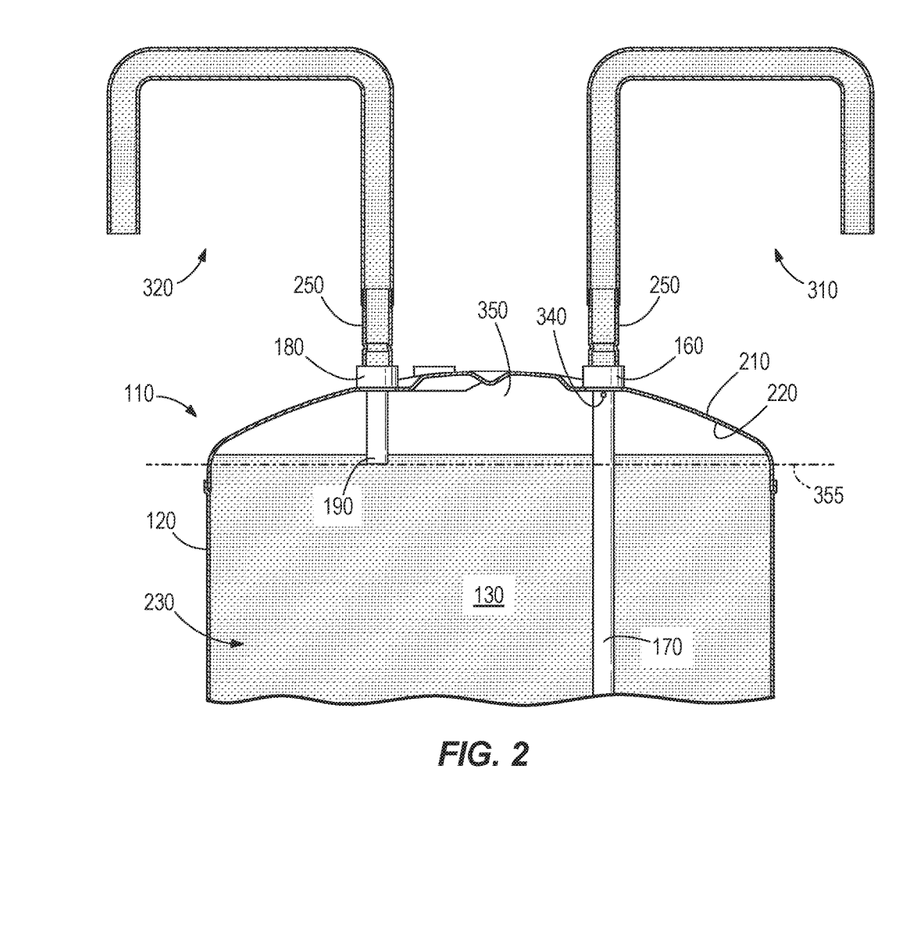
FIG. 2 is a cross-section of a top portion of the water heater in a draw condition in which water is flowing into and out of the water heater.
Figure 3:
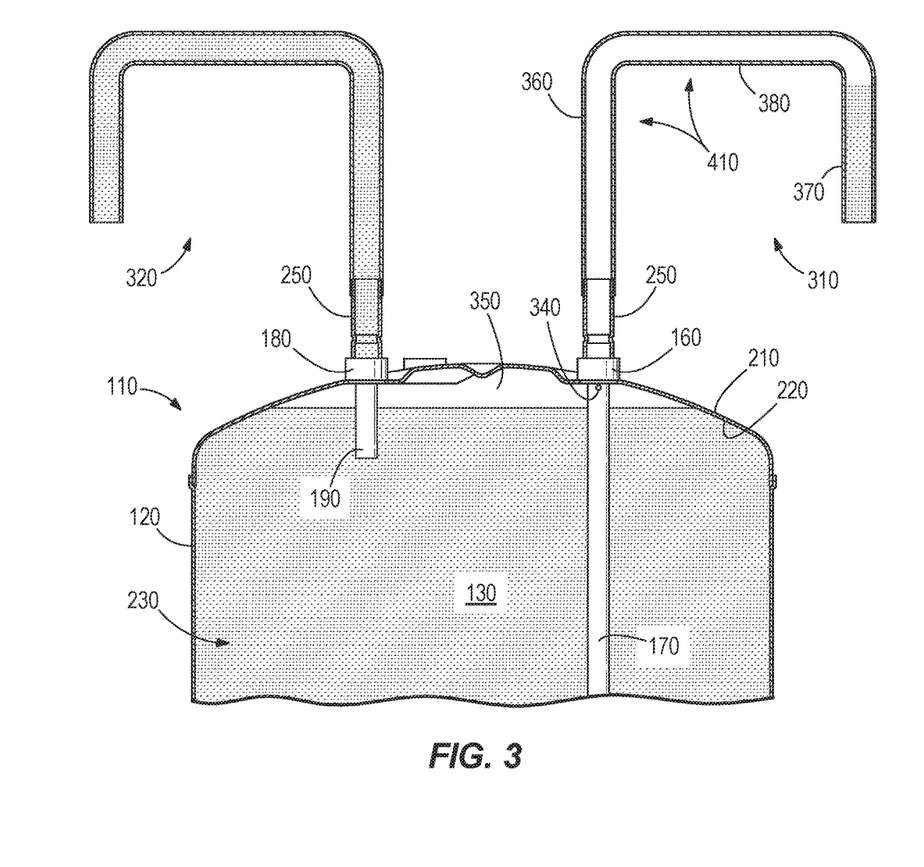
FIG. 3 is a cross-section of the top portion of the water heater in a standby condition in which no water is flowing into or out of the water heater.

As illustrated in FIGS. 2 and 3, the dip tube 170 includes an anti-siphon hole 340 in the interior space 130 just below the bottom of the inlet spud 160. The anti-siphon hole 340 is higher in the interior space 130 than the bottom end of the outlet tube 190. The anti-siphon hole 340 is a transverse opening in the dip tube 170 (i.e., allowing flow perpendicular to the longitudinal axis of the dip tube 170).

With reference to FIG. 2, when the tank 120 is initially filled (with the access point 260 open), the water level reaches the bottom of the outlet tube 190. An air pocket 350 develops above the bottom of the outlet tube 190, between the water and the concave surface 220 of the upper head 210. The tank 120 will cease filling (i.e., the tank 120 will be "full") when the water level reaches the bottom of the outlet tube 190 because at that point water is pushed out of the interior space 130 through the outlet tube 190 and hot water pipe 320. The effective length (defined below) of the outlet tube 190 defines the water level and the resulting volume of the air pocket 350.

The "effective length" of the outlet tube 190 is defined for the purposes of this description as the distance that the outlet tube 190 extends into the interior space 130 below the level of the bottom of the outlet spud 180. The effective length establishes an outlet height 355 at which the outlet tube 190 communicates with the interior space 130. Portions or lengths of the outlet tube 190 outside of the interior space 130 have no effect on the resulting volume of the air pocket 350 and are not considered part of the effective length. Another way to measure the effective length is to measure the vertical distance from the outlet height 355 to the concave inwardly-facing side 220 of the upper head 210.

For a given water heater, the effective length is selected to give the air pocket 350 a desired volume. The effective length is therefore selected based, at least in part, on the diameter of the interior space 130. For larger diameter tanks with larger diameter interior spaces it is envisioned that the effective length of the outlet tube 190 may be as short as 1 inch, whereas for smaller diameter tanks and interior spaces the effective length of the outlet tube 190 may be as long as 7 inches. The effective length may, therefore be in the range of 1-7 inches. For some applications, the effective length may be in the range of 2-5 and for other applications the effective length may be in the range of 3-4 inches.

Although the invention is illustrated and described as using an outlet tube 190 to place the outlet spud 180 in communication with the interior space 130 at a desired distance below the top of the interior space 130, the invention can be implemented in other ways which are also considered within the scope of the invention. For example, if the outlet spud 180 were positioned below the concave surface 220 (e.g., in a depression formed in the upper head 210 or mounted to a side of the tank 120), it would communicate at a lower level within the interior space 130 and have the same result as using the outlet tube 190. The invention can therefore more broadly be stated as placing the hot water outlet in communication with the interior space 130 at a desired outlet height, by any suitable means, so that an air pocket 350 of desired volume is created.

Turning now to FIG. 3, the cold water pipe 310 includes a first elevating section 360, a second elevating section 370, and a local high point section 380 communicating between the tops of the elevating sections 360, 370. The local high point section 380 may be termed "local" because it is in the immediate vicinity of the water heater 110 owing to the first elevating section 360 connecting directly to the connector 250 (or directly to the inlet spud 160 in other embodiments). The elevating sections 360, 370 and local high point section 380 are illustrated as straight pipes that define three sides of a rectangle (i.e., connecting at two right angles), but in other embodiments the local high point section 380 could be curved so the pipe sections define an upside-down U shape. The shapes of the elevating sections 360, 370 and local high point section 380 are not limiting on the invention. The local high point section 380 reaches a vertical height above both of the elevating sections 360, 370. The first elevating section 360 and the local high point section 380 together define an air trap 410 in the cold water pipe 310. In one configuration, the first elevating section 360 has a vertical run of two feet and the local high point section 380 has a horizontal run of six inches. The elbow between the first elevating section 360 and the local high point section 380 may describe an angle of, for example, ninety degrees.

The term "cold water inlet" is intended to cover any other components that are used in a particular embodiment in the delivery of cold water to the interior space 130. In this illustrated embodiment, the cold water inlet includes the inlet spud 160, the dip tube 170, the connector 250, and the air trap 410 but one should not read the term as limited to or requiring those particular elements. During standby, cold water leaks from the cold water inlet into the top portion 230 through the anti-siphon hole 340 and air is displaced out of the air pocket 350 into the cold water inlet. What results is an exchange of water in the air trap 410 for air in the air pocket 350, such that the air pocket 350 (or a portion of the pocket 350) moves into the air trap 410.

Preferably the volume of the air pocket 350 is selected to fill the air trap 410 during standby while maintaining the water level in the interior space 130 below the anti-siphon hole 340. In one exemplary configuration, the volume of the air trap 410 is about 7 cubic inches. The air pocket 350 for such configuration should be at least 7 cubic inches and preferably larger to ensure that some of the air remains in the interior space 130 to keep the water level below the anti-siphon hole 340. In other embodiments and configurations of the invention, the air pocket 350 may be smaller or larger than 7 cubic inches. The air pocket 350 may be, for example in the range of 2-12 cubic inches or in the range of 4-10 cubic inches or in the range of 6-8 cubic inches depending on the application. In some embodiments of the invention, the air pocket 350 may be of a volume that permits the water level to reach the anti-siphon hole 340 and the inlet spud 160 during standby, resulting in a relatively small amount (e.g., in the range of 2-4 cubic inches) of hot water being displaced from the interior space 130 into the inlet spud 160, connector 250 and cold water pipe 310. The outlet tube 190 does not include an anti-siphon hole and is always submersed in water in the interior space 130, so air is not displaced into the hot water pipe 320.

Because air is a good thermal insulator, the air trap 410 filled with air acts as a thermal break between the hot water in the tank 120 and both the cold water in the cold water pipe 310 and the ambient air surrounding the cold water pipe 310. Additionally, the present invention prevents or greatly diminishes hot water from being displaced from the interior space 130 and being in direct contact with the walls of the cold water pipe 310 and the cold water contained in the cold water pipe 310 during standby.

Turning again to FIG. 2, during a hot water draw, the air in the air trap 410 is pushed back into the interior space 130 (through the anti-siphon hole 340 or through the lower end of the dip tube 170 or both) by the incoming cold water. In this regard, the present invention moves the air pocket 350 (or a portion of the air pocket 350) between the interior space 130 and the air trap 410 during draws and standby, respectively.

Figure 4:
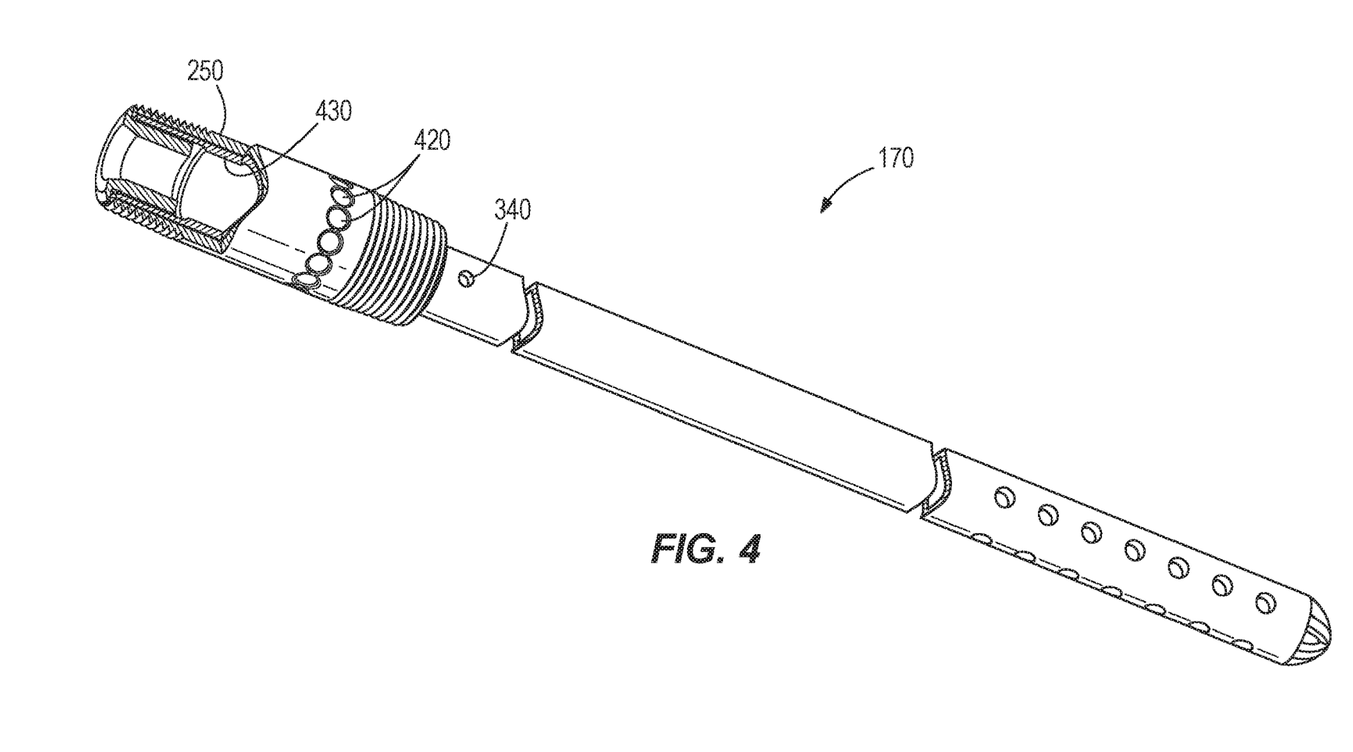
FIG. 4 is a perspective view of a water inlet assembly.

FIG. 4 illustrates an exemplary dip tube assembly, which includes a connector 250 (in the form of a pipe nipple) mechanically fixed to the upper end of the dip tube 170 by way of crimps 420 or the like. If desired, a dielectric or seal 430 can be interposed between the connector 250 and the dip tube 170 to physically separate and seal between those components. The anti-siphon hole 340 is illustrated a short distance from the bottom of the connector 250, which would position the anti-siphon hole 340 very near the concave side 220 of the upper head 210 upon installation. The dip tube 170 in FIG. 4 includes a closed end with transverse outlet holes so that incoming cold water is released in a direction perpendicular to the longitudinal axis of the dip tube 170. In other embodiments, the dip tube 170 may include a combination of axial and transverse outlet holes, depending on the design strategy for the water heater.

Figure 5:
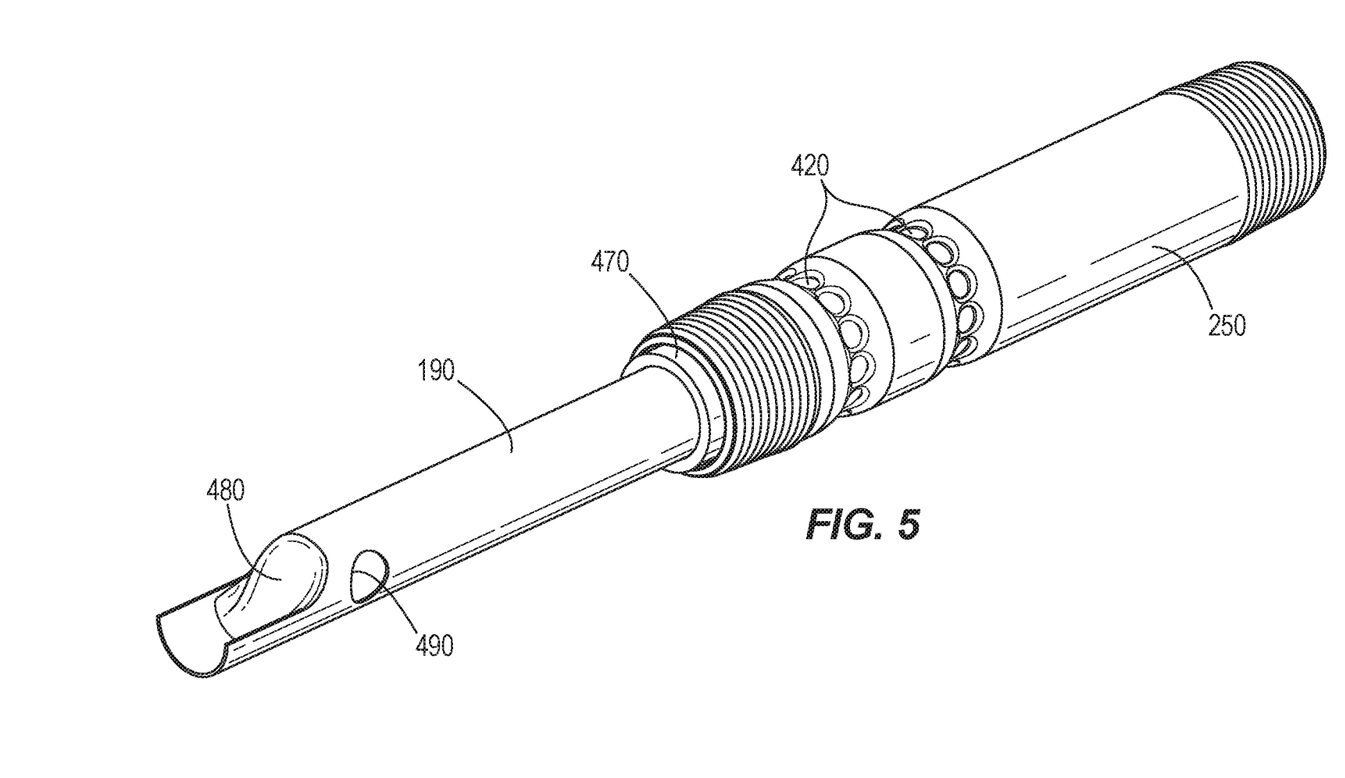
FIG. 5 is a perspective view of a water outlet assembly.

FIG. 5 illustrates an exemplary outlet tube assembly, which includes a connector 250, the outlet tube 190, and a seal 470. The distal end 480 of the outlet tube 190 in this embodiment is crushed or otherwise closed off so that there is no fluid flow in or out of the tube 190 through the distal end 480. Instead, the outlet tube 190 is provided with transverse openings 490 (i.e., permitting flow perpendicular to the longitudinal axis of the outlet tube 190) which communicate through the tube wall with the inside of the outlet tube 190. In other embodiments, the outlet tube 190 may include a combination of axial and transverse openings for drawing hot water from the interior space 130 in respective parallel and perpendicular directions with respect to the outlet tube's 190 longitudinal axis. The seal 470 is double sealed with a mechanical sealing such as crimps 420 similar to those used in the dip tube assembly.

When the outlet tube assembly is installed in the water heater 110 with the longitudinal axis of the outlet tube 190 vertical, the laterally-facing openings 490 draw water into the outlet tube horizontally. One potential advantage of this configuration is that the outlet tube 190 is less likely to entrain air bubbles that have been pushed out of the dip tube 170 during the hot water draw, and which are floating vertically back to the top portion 230 to reform the air pocket 350. Although the air pocket 350 may be relatively large when the interior space 130 is first filled, each draw following the formation of a thermal break runs the risk of air being pulled out of the interior space 130 through the outlet tube 190. Having the opening of the outlet tube 190 facing down may increase the likelihood that the air bubbles are entrained, whereas using horizontally-facing openings may reduce the likelihood. The decision to use axial and/or transverse openings in the outlet tube 190 may depend on a number of considerations in addition to maintenance of the air pocket 350 over multiple draws.

Figure 6:
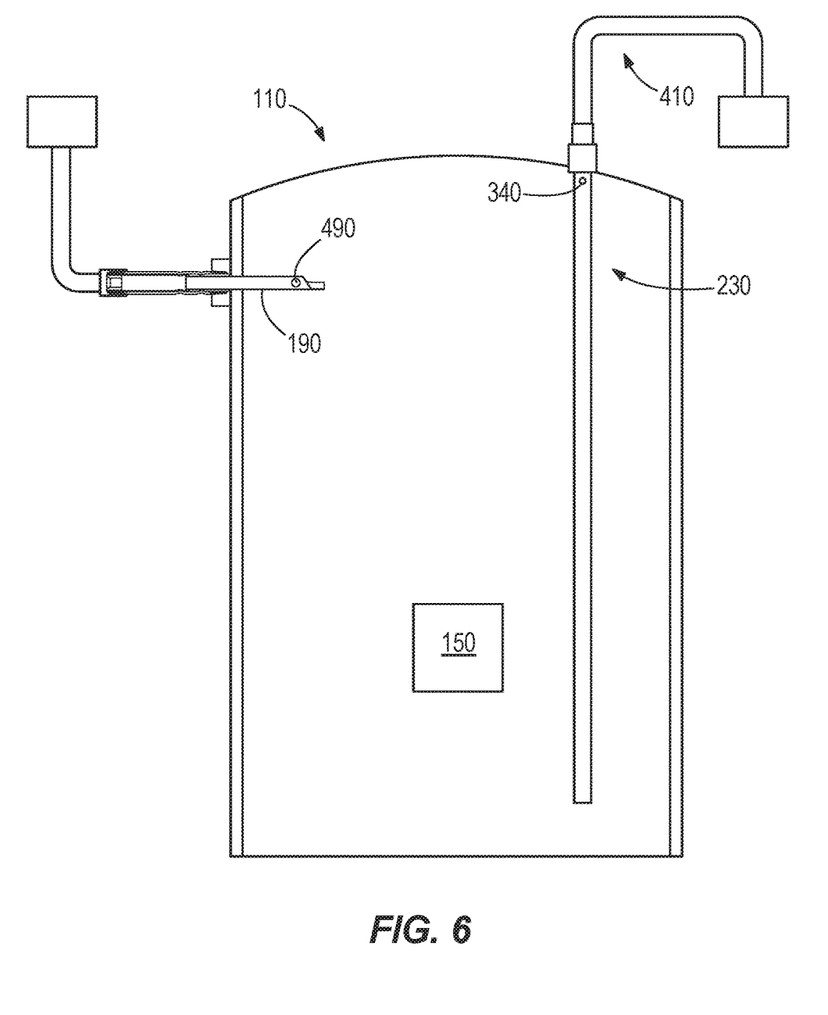
FIG. 6 is a cross sectional view of another configuration for a water heater.

FIG. 6 illustrates another configuration of the water heater 110, having all the same components as in FIG. 1, but with the outlet tube 190 of FIG. 5 extending horizontally into the interior space 130 through a sidewall of the tank 120. In this configuration, the outlet tube 190 does not extend through the top portion 230, but instead extends under the top portion 230. The water line will be about even with or slightly above (due to thermal expansion) the opening or openings 490 in the outlet tube 190. With a side-mounted outlet spud, one could dispense with the outlet tube 190 because an outlet hole in the side of the tank 120 should always be at or slightly below the water line. But even in the side-mount configuration the outlet tube 190 permits control of the volumetric flow rate and direction in which hot water is drawn from the interior space 130, which may be helpful in minimizing how much air is entrained in the hot water draws. In addition to disposing the outlet tube vertically (FIG. 1) and horizontally (FIG. 6) any non-vertical and non-horizontal angle is permissible within the intent of this invention. Also, for a horizontally-extending or angled outlet tube 190, one can rotate the tube 190 about its longitudinal axis to position the openings 490 horizontally, vertically, or at an angle in between horizontal and vertical.

Thus, the invention provides, among other things, a water heater including a thermal break in the form of an air pocket that moves into an air trap segment of the cold water pipe to reduce heat loss during standby.

What is claimed is:

1. A water heater, comprising:
   a tank defining an interior space adapted to contain water, a top portion of the interior space accommodating an air pocket;
   a heat source operable to heat the water within the tank;
   a hot water outlet in fluid communication with the interior space at an outlet height below the top portion to draw hot water from the tank; and
   a cold water inlet in fluid communication with the top portion, the cold water inlet adapted to deliver cold water to the interior space from a cold water source;
   wherein the cold water inlet includes an anti-siphon mechanism communicating with the top portion such that during standby of the water heater cold water leaks into the top portion through the anti-siphon mechanism and air from the air pocket displaces into the cold water inlet through the anti-siphon mechanism to form a thermal break; and
   wherein, during a draw of hot water, the air of the thermal break is pushed into the interior space by cold water being introduced into the interior space through the cold water inlet.

2. The water heater of claim 1, wherein:
   the cold water inlet includes a dip tube, and the anti-siphon mechanism includes an anti-siphon hole in the dip tube communicating with the top portion.

3. The water heater of claim 1, wherein a maximum height of the top portion is 1-7 inches.

4. The water heater of claim 1, wherein a maximum height of the top portion is 2-5 inches.

5. The water heater of claim 1, wherein a maximum height of the top portion is 3-4 inches.

6. The water heater of claim 1, wherein a volume of the air pocket is 2-12 cubic inches.

7. The water heater of claim 1, wherein the hot water outlet includes an outlet tube extending through the top portion.

8. The water heater of claim 1, wherein the hot water outlet includes an outlet tube extending vertically through the top portion.

9. The water heater of claim 1, wherein the hot water outlet includes an outlet tube extending horizontally below the top portion.

10. The water heater of claim 1, wherein the hot water outlet includes an outlet tube having a horizontally-facing opening for the flow of hot water horizontally into the outlet tube during a hot water draw.

11. The water heater of claim 1, further comprising a gasket forming an airtight seal up to a pressure of 60 psi around the hot water outlet to prevent leakage of the air pocket around the hot water outlet.

12. The water heater of claim 1, further comprising a cold water supply pipe communicating between the cold water inlet and the cold water source, the cold water supply pipe including an air trap segment to trap the displaced air and form the thermal break.

13. The water heater of claim 12, wherein the air trap segment includes a local high point section to trap the displaced air and form the thermal break.

14. The water heater of claim 12, wherein a volume of the top portion is equal to or greater than a volume of the air trap segment.

15. A method for heating water, comprising:
   providing a water heater including a tank having an interior space, a cold water inlet communicating between a top portion of the interior space and a cold water source, a hot water outlet communicating with the interior space at an outlet height below the top portion, and a heat source;
   filling the tank with water through the cold water inlet while the hot water outlet is open, to form an air pocket in the top portion;
   heating the water in the tank with the heat source;
   during standby, leaking water through the cold water inlet into the top portion and displacing air from the air pocket into the cold water inlet to form a thermal break between water within the interior space and the cold water source;
   drawing hot water from the interior space at the outlet height through the hot water outlet;
   introducing cold water into the interior space through the cold water inlet in response to drawing hot water from the interior space;
   pushing the air of the thermal break into the interior space with the cold water being introduced; and
   reforming the air pocket in the top portion with the air that is pushed into the interior space.

16. The method of claim 15, wherein:
   the cold water inlet includes an anti-siphon mechanism communicating with the top portion; and
   leaking cold water into the top portion and displacing air from the air pocket are both performed through the anti-siphon mechanism.

17. The method of claim 15, wherein:
   the cold water inlet includes a dip tube having an anti-siphon hole communicating with the top portion; and
   leaking cold water into the top portion and displacing air from the air pocket are both performed through the anti-siphon hole.

18. The method of claim 15, further comprising: forming an airtight seal up to a pressure of 60 psi around the hot water outlet to prevent leakage of the air pocket around the hot water outlet.

19. The method of claim 15, further comprising communicating the cold water source with the cold water inlet through a cold water supply pipe having an air trap segment; and wherein forming the thermal break includes capturing the displaced air in the air trap segment.

* * * * *